United States Patent [19]
Länger

[11] 3,824,620
[45] July 16, 1974

[54] CIRCUIT ARRANGEMENT FOR COMPENSATING DROP-OUT IN THE REPRODUCTION OF SIGNALS RECORDED ON A RECORD CARRIER

[75] Inventor: Erich Länger, Sudstadt, Austria

[73] Assignee: U.S. Philips Corporation, New York, N.Y.

[22] Filed: July 13, 1972

[21] Appl. No.: 271,348

[30] Foreign Application Priority Data

July 15, 1971 Austria ............................. 6162/71

[52] U.S. Cl. .............................................. 360/38
[51] Int. Cl. ............................................ H04n 5/78
[58] Field of Search .................. 178/6.6 A, 6.6 DC; 179/100.2 K

[56] References Cited

UNITED STATES PATENTS

| | | | |
|---|---|---|---|
| 2,996,576 | 8/1961 | Dolby | 178/6.6 DC |
| 3,328,521 | 6/1967 | Moskovitz | 178/6.6 DC |
| 3,699,246 | 10/1972 | Hodge | 178/6.6 DC |

*Primary Examiner*—Raymond F. Cardillo, Jr.
*Attorney, Agent, or Firm*—Frank R. Trifari; Henry I. Steckler

[57] ABSTRACT

A playback system for a video signal recorded on a carrier signal has a drop-out compensation circuit. This circuit has two channels, one of which delays the reproduced signal. If a drop-out occurs a switch selects the delayed channel. Demodulators are coupled to the switch in each channel and compensate for the switching time of the switch.

10 Claims, 3 Drawing Figures

Figures 1, 2:
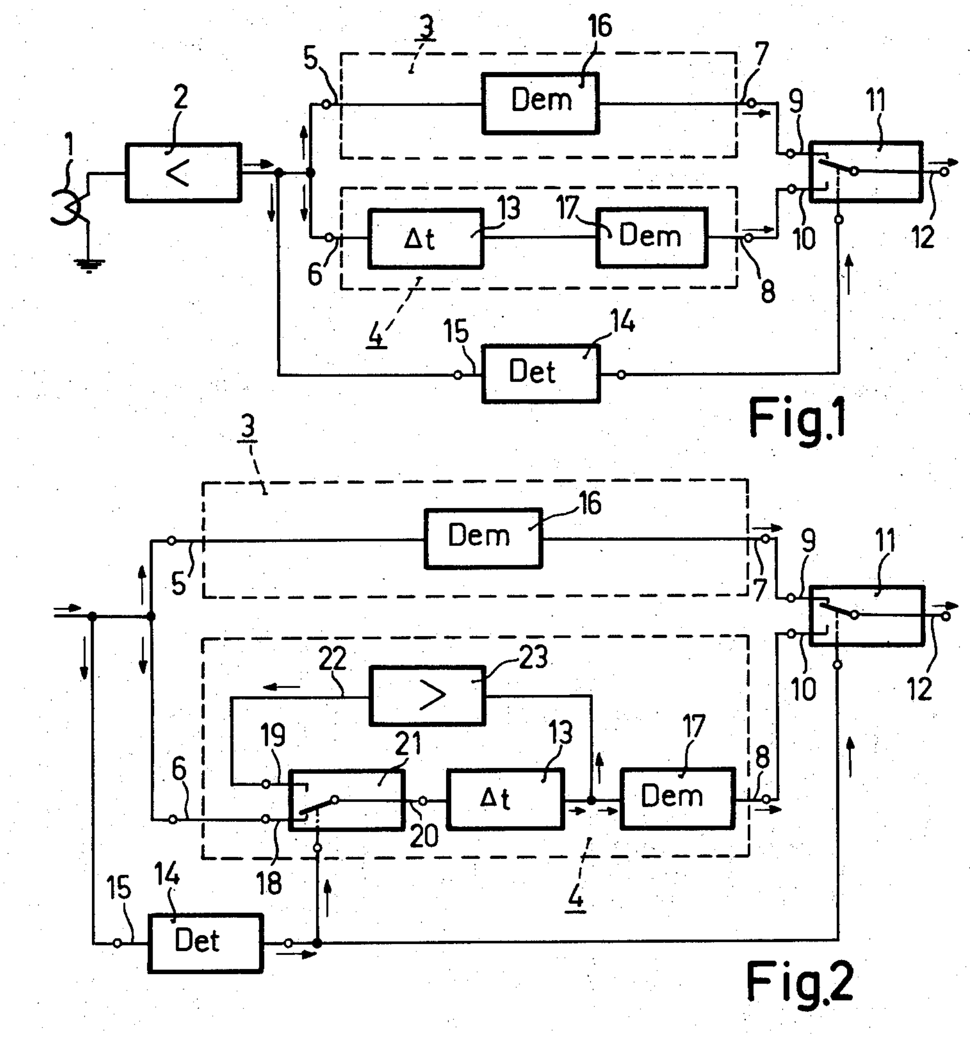

CIRCUIT ARRANGEMENT FOR COMPENSATING DROP-OUT IN THE REPRODUCTION OF SIGNALS RECORDED ON A RECORD CARRIER

The invention relates to a circuit arrangement for compensating drop-out in the reproduction of signals recorded on a record carrier, which usually is a magnetic recording tape and hereinafter is referred to as tape. The signals modulate a carrier. The circuit arrangement comprises two transmission channels which each have an input and an output. An electronic switch has two inputs which each are connected to an output of one of the two transmission channels and an output at which the signal appears from which the drop-out disturbances have been removed. A detection circuit detects a drop-out disturbance in the signal derived from the tape and serves to control the electronic switch. The first of the two transmission channels transmits the signal supplied to it substantially without delay, while the second transmission channel, which is provided with a delay circuit, transmits the signal applied to it with a predetermined time delay. The signal which modulates the carrier together with the carrier is derived from the tape and is applied to the inputs of the two transmission channels. On the occurrence of a drop-out disturbance, the detection circuit changes over, for the duration of the drop-out disturbance, the electronic switch from the position in which its input connected to the output of the first transmission channel is connected to the switch output to the position in which its input connected to the second transmission channel is connected to the switch output.

In such a circuit arrangement, which is described in Published German Patent Application No. 1,202,315, it is important that on the occurrence of a drop-out disturbance the detection circuit changes over the electronic switch substantially without any delay, because otherwise the beginning of the disturbance is not compensated. Because in practice a change-over cannot be performed without any delay, in another circuit arrangement for drop-out compensation, which is described in Published German Patent Application No. 1,263,815, it is proposed to compensate the time which the detection circuit requires to respond by means of a separate delay circuit for the signal derived from the tape, but this causes an increase in cost.

In a circuit arrangement of the type mentioned at the beginning of this specification the signals derived from the tape are applied to the two inputs of the electronic switch in the form of signals modulating a carrier. If a method of modulation is used in which the information of the signal is determined by the passages through zero of the carrier, as is the case with frequency and/or phase modulation, each change-over of the electronic switch from one transmission channel to the other gives rise to a sudden phase shift which manifests itself as a disturbance in the demodulated signal; in the case of a video signal these disturbances take the form of bright or dark spots. This disadvantage may be avoided by using a circuit arrangement of a type described in the aforementioned Published German Patent Application No. 1,263,815 in which the signal derived from the tape is applied after demodulation to an input of the electronic switch, the delay circuit for delaying the signal produced at the output by the predetermined time being connected between the output and the second input of the electronic switch. It is true that in this manner sudden phase shifts are avoided, because the electronic switch switches from one demodulated signal to another demodulated signal, but the delay circuit required is complicated and expensive. This is due to the fact that the time delays which in general are required for such circuit arrangements are obtainable only by means of delay lines which delay the signal in its form in which it modulates a carrier, so that in the case under consideration a separate modulator which precedes the delay line and a separate demodulator which succeeds the delay line are required.

The invention avoids the aforedescribed difficulties in a simple manner in that in a circuit arrangement of the type described at the beginning of this specification a demodulator for demodulating the signal modulating the carrier is provided in each of the two transmission channels at a point preceding the respective input of the electronic switch. Owing to the time delay inherent in a demodulator the provision of a demodulator in each transmission channel ensures that the signals applied to the two inputs of the electronic switch are delayed by a time such that the detection circuit will respond with certainty when a drop-out disturbance occurs, even before the disturbance has reached the respective input of the electronic switch, so that the electronic switch is switched from an undisturbed signal to the delayed signal. In addition, when processing signals which so modulate a carrier that the information of the signal is determined by the passages through zero of the carrier the fact that only demodulated signals are applied to the electronic switch provides the advantage that during the switching operations no sudden phase shifts may be produced which give rise to disturbances. This ensures that a changeover from one transmission channel to the other is effected without any trouble and without giving rise to disturbances in the signal to be processes further.

It has proved particularly advantageous to include in the second transmission channel at a point preceding the delay circuit another electronic switch having two inputs and one output and also controlled by the detection circuit. The signal derived from the tape and still modulating the carrier is applied to the first input of this switch, while its output is connected to the delay circuit. The delay circuit output is connected by a feedback loop to the second input of the further electronic switch. In the normal position of this further switch, its first input is connected to its output and on the occurrence of a drop-out disturbance the detection circuit changes over, for the duration of the drop-out, the further electronic switch to the condition in which the second input is connected to the output. This ensures that drop-out disturbances having durations longer than the time by which the delay circuit delays the signals derived from the tape are also compensated. In this connection it has further been found to be advantageous, when the signals so modulate a carrier that the information of the signal is determined by the passages through zero of the carrier, for the feedback loop to include an amplifier designed as a limiter. This ensures that the signal used for drop-out compensation always has a constant level and the feedback loop is entirely stable.

It will be clear that it is important that the demodulated signals applied to the two inputs of the electronic switch should have the same alternating-voltage and direct-voltage levels to prevent a change-over of the electronic switch from giving rise to sudden signal changes which may manifest themselves as disturbances. This is obtainable in known manner by means of adjusting controllers which directly influence the corresponding levels of the signals. If signals are used which so modulate a carrier that their information is determined by the passages through zero of the carrier, the aforementioned conditions may advantageously be satisfied by using a demodulator in one transmission channel, preferably in the second transmission channel, which is designed as a pulse integrator which includes a low-pass filter, at least one capacitor, preferably the input capacitor, of the low-pass filter being adjustable. Thus a single adjusting element enables both the alternating-voltage level and the direct-voltage level of the signal to be adjusted, because these two quantities vary in synchronism with one another when the capacitance in the low-pass filter is changed.

Figure 3:
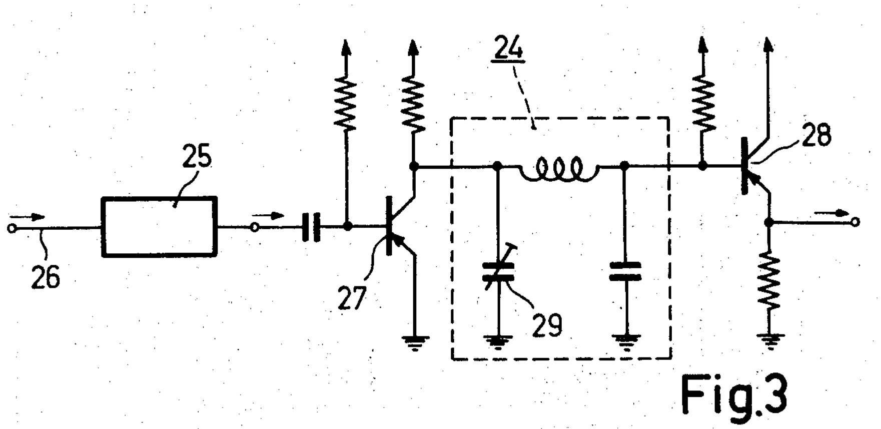

Embodiments of the invention will now be described, by way of example, with reference to the accompanying diagrammatic drawings, in which:

FIG. 1 is a block diagram of the fundamental embodiment of a circuit arrangement according to the invention, FIG. 2 shows an advantageous more elaborated embodiment of the circuit arrangement shown in FIG. 1, and FIG. 3 shows in more detail a demodulator which may be used to advantage in circuit arrangements according to the invention.

Referring now to FIG. 1, reference numeral 1 denotes a magnetic head used to scan a tape or the like on which signals modulating a carrier are magnetically recorded. The type of modulation is not essential and may, for example, be frequency modulation, which is preferably used in the magnetic recording of video signals. Recording a signal modulating a carrier is not restricted to magnetic methods, but may be effected in a variety of manners, for example by influencing a tape by energy radiation in known manner. The signal which is derived from the tape by means of the magnetic head 1 and still modulates a carrier is applied via an amplifier 2, which if required may include filters, a limiter or the like, to the circuit arrangement for drop-out compensation. This circuit arrangement comprises a first transmission channel 3 and a second transmission channel 4 the respective inputs 5 and 6 of which are jointly connected to the amplifier 2. The outputs 7 and 8 of the two transmission channels are each connected to an input 9 or 10 respectively of an electronic switch 11 which has a single output 12. The transmission channel 3 serves to transmit the signal modulating a carrier in the normal manner. The transmission channel 4, however, includes a delay device 13 which delays the signal modulating a carrier by a predetermined time. In the normal position the electronic switch 11 connects its input 9 connected to the channel 3 to its output 12 at which consequently the normal signal derived from the tape is available for further processing. A detection circuit 14 the input 15 of which is also connected to the output of the amplifier 2 serves to change over the electronic switch 11 to the position in which its input 10 connected to the transmission channel 4 is connected to its output 12. This detection circuit senses whether the signal derived from the tape contains a drop-out disturbance. If this is the case, the detection circuit changes over the electronic switch for the duration of the drop-out in the manner described hereinbefore, so that the signal stored in the transmission channel 4 appears at the output 12. Thus the disturbed location in the normal signal is replaced in known manner by a signal which previously was available in the transmission channel 4 according to the predetermined delay time and which may with a high degree of probability be assumed to be undisturbed. If a circuit arrangement for processing video signals is concerned, the delay time is advantageously made equal to the line period, so that disturbances in a line are replaced by the picture content of the preceding line. The detection circuit ascertains whether the signal derived from the tape contains a drop-out, for which purpose it may simply be an envelope detector. Obviously it is not absolutely necessary for the detection circuit to be connected to the output of the amplifier 2, but the signal containing drop-out disturbances may also be derived from another suitable point of the circuit arrangement, for example directly from the magnetic head 1.

Each transmission channel 3 and 4 includes a demodulator 16 and 17 respectively at a point preceding the input 9 and 10 respectively of the electronic switch 11. This ensures that the signals transmitted in the two transmission channels are delayed in time owing to the property inherent in any demodulator that because of the activity of its demodulation filter the output signal is delayed by a certain time with respect to its input signal. The fact that the detector circuit is in the usual manner proportioned so as to have a very fast response ensures that on the occurrence of a drop-out disturbance the switch 11 changes over, i.e. its input 10 is connected to its output 12, at an instant at least slightly preceding the instant at which the drop-out disturbance reaches the input 9 of the electronic switch. Thus the beginning of a drop-out disturbance is prevented from reaching the output 12 of the electronic switch before the latter changes over. Advantageously the two demodulators 16 and 17 are proportioned so as to provide equal delay times in order to ensure that the signals of the two transmission channels are equally treated with regard to their delays relative to the response of the detection circuit. For this purpose preferably equally operating demodulators are used in the two transmission channels. If required, differences in the delay times of the two demodulators may be removed by means of the delay device 13.

When the signals modulate a carrier so that their information is determined by the passages through zero of the carrier, the circuit arrangement described provides a further advantage in that each transmission channel 3 and 4 includes a demodulator, for thus demodulated signals only reach the inputs of the electronic switch which is capable of switching them without causing disturbances. This is desirable because it has been found that when the electronic switch switches signals which still modulate a carrier in the aforementioned manner the change-over from one carrier to the other gives rise to sudden phase shifts which manifest themselves as disturbances in the demodulated signal.

In the embodiment shown in FIG. 2 the second transmission channel 4 includes a further electronic switch 21 which is controlled by the detection circuit 14 and has two inputs 18 and 19 and an output 20. The signals applied to the input 6 of the transmission channel 4 are supplied to the input 18 of the further electronic switch. To the output 20 of the further electronic switch 21 is connected the delay circuit 13 the output of which is additionally connected to the second input 19 of this electronic switch 21 by a feedback loop 22. In its normal position the electronic switch 21 connects its input 18 to its output 20. In this case the signals derived from the tape are continuously stored in the delay device 13.

On the occurrence of a drop-out disturbance the detection circuit 14 responds and changes over both electronic switches 11 and 21, which in the latter switch means that its input 19 is connected to its output 20. As a result, however, the feedback loop is closed, so that the signal produced at the output of the delay device 13 is fed back to its input. Thus the signal stored in the delay device is retained and is continuously used for drop-out compensation until the disturbance due to the drop-out or drop-outs is terminated and the electronic switches return to their normal positions. This ensures that drop-out disturbances of durations longer than the time by which the delay 13 delays signals applied to it are replaced by a preceding signal.

In the embodiment shown in FIG. 2 the feedback loop 22 includes an amplifier 23 which, at least largely, compensates losses in level due to the passage of the signal through the delay device and thus ensures that for the entire duration of the compensation a signal at substantially the original level is always available. If signals modulating a carrier in a manner such that the information of the signal is determine by the passages through zero of the carrier are processed, the amplifier 23 preferably takes the form of a limiter. This provides complete stability of the feedback loop 22, because the signals which pass through this loop cannot build up to oscillation owing to the limiter action.

FIG. 3 shows a circuit arrangement for a demodulator which may be used to advantage in the aforedescribed circuit arrangement when signals are to be processed which so modulate a carrier that their information is determined by the passages through zero of the carrier. This demodulator is in the form of an integrator which comprises a low-pass filter 24 which advantageously is preceded by a limiter 25 which may be self-oscillating in the absence of an input signal. The signal modulating a carrier is applied to the input 26 of the limiter; at the output of the limiter a pulse train is produced in which the repetition frequency of the pulses represents the information content of the signal to be demodulated. This pulse train is applied via a control transistor 27 to the low-pass filter 24 in which the individual pulses are integrated, resulting in an output signal having a given direct-voltage and alternating-voltage level. An emitter follower 28 forms the output of the demodulator.

As will be appreciated, in order to ensure that the signals from the two transmission channels 3 and 4 are combined by means of the electronic switch 11 without the occurrence of disturbances it is of importance that the two signals should be applied to the inputs of this switch with equal direct-voltage and alternating-voltage levels. Owing to the usual tolerances to which the demodulators usually are subject this is not automatically the case in general. When video signals are processed this difference in level would give rise to differences in brightness at each change-over of the electronic switch. In the demodulator described the two levels may simply be matched owing to the fact that the value of the input capacitor 29 of the low-pass filter is adjustable, for in the integration of the pulse train a variation of this capacitance value results in a variation of the direct-voltage level, the alternating-voltage level of the signal following this variation in time and in proportion, so that the relationship between the direct-voltage level and the alternating-voltage level is not changed, enabling the two levels of one channel to be simultaneously matched to the corresponding levels of the other channel. Obviously a capacitor other than the input capacitor of the low-pass filter may be adjustable, however, the desired result is best achieved by variation of the value of the input capacitor.

This is another reason why in the two transmission channels 3 and 4 demodulators of equal type of operation should be used to ensure that the signals applied to the electronic switch 11 automatically are as equal as possible in respect of their direct-voltage and alternating-voltage levels. A demodulator of the type described hereinbefore including an adjustable input capacitor in its low-pass filter is preferably provided in the second transmission channel 4, because the channel is made operative comparatively seldom, i.e. only at the occurrence of a drop-out disturbance, and it is more expedient to match the signal of rarer occurrence to the signal of frequent occurrence than conversely.

What is claimed is:

1. A circuit comprising input means for receiving a modulated signal subject to drop outs, delay means having an input coupled to said input means and an output, a means for detecting drop outs having an input coupled to said input means and an output, a first switch having an output, first and second signal inputs, and a control input means coupled to said detector output for coupling said second input to said output upon the occurrence of a drop out, said first input normally being coupled to said switch output, and means for demodulating said signal and for compensating for the switching time of said switch comprising a first demodulator having an input coupled to said input means and an output coupled to one of said switch signal inputs, and a second demodulator having an input coupled to said delay means output and an output coupled to the remaining switch input.

2. A circuit as claimed in claim 1 further comprising a magnetic reproducing head coupled to said input means.

3. A circuit as claimed in claim 1 wherein said modulated signal comprises a video signal and said delay means has a delay equal to one line period of said video signal.

4. A circuit as claimed in claim 1 wherein said demodulators having equal delay times.

5. A circuit as claimed in claim 1 further comprising a second switch having an output coupled to said delay means input, a first input coupled to said input means and normally coupled to said output, a second input, and a control input means coupled to said detector for coupling said second input to said output upon the occurrence of drop outs; and a feedback loop coupled between said second switch second input and said delay means output.

6. A circuit as claimed in claim 5 wherein said feedback loop comprises a limiter.

7. A circuit as claimed in claim 1 wherein at least one of said demodulators comprises an integrator including a low pass filter.

8. A circuit as claimed in claim 7 wherein said demodulator comprising said integrator comprises said second demodulator.

9. A circuit as claimed in claim 7 wherein said filter comprises a variable capacitor.

10. A circuit as claimed in claim 9 wherein said variable capacitor comprises an input capacitor of said filter.

* * * * *